United States Patent Office 2,744,923
Patented May 8, 1956

2,744,923

PREPARATION OF ORGANOPOLYSILOXANES

John J. Duane, Kenmore, N. Y., assignor to Union Carbide and Carbon Corporation, a corporation of New York No Drawing. Application June 22, 1951,
Serial No. 233,121

14 Claims. (Cl. 260—448.2)

The invention is concerned with the making of organopolysiloxanes (commonly called "silicones") and more particularly it consists in an improved process for condensing or polymerizing silanols to higher polymeric siloxane products.

Organosilanols are the intermediate products in the preparation of silicones. They have the representative structure $R_xSi(OH)_{4-x}$, where R is alkyl, aryl, or other organic radical capable of direct union with the silicon atom, and $x$ is a number not exceeding 3. Silanols result from the hydrolysis of corresponding halogenosilanes, or other hydrolyzable silane derivatives, and they in turn condense, or can be caused to condense, to form the characteristic Si—O—Si bond structure of the polysiloxanes. The ease with which the silanols condense is dependent in large part upon the nature of the organic radical or radicals attached to the silicon atom in the monosilane starting compound, and while condensation to varying degrees often occurs almost simultaneously with the hydrolysis, the usual product from the hydrolyzing step is either a complete silanol derivative, or a partially condensed siloxane containing a high proportion of uncondensed hydroxyl groups attached to the silicon. In either instance further condensation must then be effected in order to obtain the higher molecular weight siloxane polymers, and in prior practice the accomplishment of this, with end results at all uniform, has been attained only with considerable difficulty.

It is an object of this invention to provide means for controlling more readily and accurately the condensation of organosilanols, in order to obtain siloxane polymers more consistent and uniform in molecular structure and size.

In accordance with the invention the intermediate silanol product from a chlorosilane or other silane hydrolysis is further condensed in the presence of an anhydrous potassium salt of a weak acid, with other conditions being controlled, particularly as to temperature and pressure, so that water of condensation is permitted to escape from the reaction zone. Anhydrous potassium carbonate is especially effective as a condensing agent, and substantially similar results have been obtained with condensation in the presence of other dry, normal potassium salts of weak acids, such, for example, as potassium bicarbonate, potassium cyanide, or potassium phosphate.

The function of the potassium salt in this reaction is very specific, in its ability to condense Si—OH units in the molecule without affecting the essential Si—O—Si bonding of the siloxane structure, or linkages like Si—OR or Si—H, which are often desirable in the final polymer product. It also appears that this unique action is specific only to the anhydrous potassium salts of the kind mentioned, as attempts to effect similar results with sodium carbonate have been quite unsuccessful, and, as is well known, compounds like potassium and sodium hydroxides effect polymerization by action on Si—O—Si bonds as well as the Si—OH linkages. The latter condensing agents also attack Si—OR bonds, and quantitatively break up any Si—H units which may be present.

The process of the invention is widely applicable in furthering the condensation of hydrolysis products from a variety of silane starting materials and mixtures thereof, and this is additionally illustrated in the following examples, showing first the condensation of pure silanol materials, and then the process as applied sequentially with the hydrolyzing step in a polymer-forming reaction.

Example 1

A sample of high purity crystalline diethylsilanediol, $(C_2H_5)_2Si(OH)_2$, was heated with anhydrous potassium carbonate for one and a half hours, under about 5 mm. pressure and at maximum temperature of 140° C. A very viscous oil was obtained, showing a condensation, or polymerization, well beyond that which normally occurs under the same conditions without the presence of potassium carbonate.

Example 2

A mixture of 4 gram moles of diethylsilanediol, $(C_2H_5)_2Si(OH)_2$, and 1 gram mole of diphenylsilanediol, $(C_6H_5)_2Si(OH)_2$, was heated with anhydrous potassium carbonate for one hour, to a temperature of 100° C. under about 5 mm. pressure. A very heavy oil resulted, showing a viscosity of 14,500 centistokes at 100° F. From the solubility characteristics of this oil, there was clear indication that copolymerization took place, as well as a quite complete condensation of all hydroxyl units.

Example 3

Diethyldichlorosilane was hydrolyzed by adding 7 moles of this silane to a suspension of 1500 grams of sodium bicarbonate in a solvent mixture of 1250 cc. of ether and 250 cc. of acetone. This method of hydrolyzing is described in further detail in my copending application Serial No. 133,689, filed December 17, 1949. The product, after filtering and removing solvent, was largely low molecular weight diethylsilanols, such as diethylsilanediol and the linear trimer and tetramer homologues. The uncondensed hydroxyl content was 9.2%, which lies between the similar values for the trimer and tetramer. Extraction with water showed that the monomeric diol was present, but only in small amounts. One hundred grams of this product was refluxed at about 5 mm. pressure in the presence of 5 grams of potassium carbonate. At the end of 25 minutes, the temperature had reached 120° C., and an increase in viscosity was evident. After heating an additional hour and a half at about 5 mm. pressure, the polymer was scarcely pourable. The product was dissolved in ether, washed, dried, and then concentrated to a clear, extremely viscous oil.

Example 4

Diethyldichlorosilane in an amount of 4 moles was hydrolyzed in 3000 cc. of acetone with 900 grams of sodium bicarbonate. After filtering and removing the solvent, the hydrolysis product was heated under about 5 mm. pressure for 3 hours with 25 grams of potassium carbonate, the maximum temperature being 130° C. The resulting polymer was so elastic that it could be pulled out through the neck of the flask in one piece. The elastomer flowed under influence of gravity and was soluble in ether. A substantially complete polymerization appeared to have been attained in this product.

A second experiment similar to the above was made except that the hydrolyzate was heated for only two hours with potassium carbonate. The resultant polymer was a barely pourable oil.

Example 5

Diphenyldichlorosilane was hydrolyzed by the sodium bicarbonate technique of the two above examples, giving a nearly white crystalline product comprised mostly of diphenylsilanediol. A portion of the latter was heated under vacuum with potassium carbonate to 180° C., and a solid, dilatant, thermoplastic resin was obtained.

Example 6

Ethyltrichlorosilane was hydrolyzed in the presence of sodium bicarbonate to yield a very viscous oil. This oil, in amount of 0.13 gram mole, was dissolved in acetone together with 0.32 mole diethylsilanediol and 0.08 mole diphenylsilanediol. The solution was warmed with 5 grams of potassium carbonate, under 5 mm. pressure at 25° C. for 30 minutes, while acetone was removed. The potassium carbonate became hydrated and 5 grams more were added. After further heating to 40° C., it was necessary to decant the light oil onto additional dry potassium carbonate, and heating was then continued for another 30 minutes, reaching a temperature of 90° C. The final product was a gel which was clearly indicated to be of a copolymer composition.

Example 7

Six gram moles of diethyldichlorosilane and 1 gram mole of trimethylchlorosilane were added to a slurry of 1400 grams of sodium bicarbonate in a mixture of 1 liter of ether and a half liter of acetone. Under these conditions, linear silanols are formed rather than the cyclic polymers. The hydrolyzed residue was refluxed at 140° C. and 5 mm. pressure for 15 hours, in the presence of 10 grams of potassium carbonate. The viscosity of the product was 401 centistokes at 100° F., and the molecular weight was 2140. The presence of $(CH_3)_3SiCl$ in this reaction, which acted as a molecule end-blocking agent, suppresses a further increase in viscosity and molecular weight of this product.

Example 8

Three gram moles of diethyldichlorosilane and 1 gram mole of trimethylchlorosilane were added slowly to 800 grams of sodium bicarbonate slurried in 3000 cc. of acetone. The slurry was dried over calcium sulfate and filtered. To the filtrate 5 grams of $K_2CO_3$ were added, and the solvent was removed under vacuum. Some condensation took place with release of water sufficient to dissolve the potassium carbonate. The light oil was separated and refluxed with 5 grams more of potassium carbonate under 5 mm. pressure. After 15 minutes the temperature had reached 60° C., and the inadequate amount of $K_2CO_3$ was hydrated. This oil was again decanted onto 5 grams of fresh anhydrous $K_2CO_3$, and heated, with provision for removing the water evolved from the reflux condenser to prevent hydration of the $K_2CO_3$. After an hour and a half at 125° C., 72% of the polymer was recovered. The oil product had a viscosity of 104 centistokes at 100° F., and the silanol content was less than 0.1%.

In a second similar experiment, 3 gram moles of diethyldichlorosilane and a half mole of trimethylchlorosilane were added to 800 grams of sodium bicarbonate slurried in 3000 cc. of acetone. In this run considerably more potassium carbonate was used, and on heating the water evolved was removed as it entered the reflux condenser. After 2 hours at a temperature reaching a maximum of 135° C., under 5 mm. pressure, 79% of polymer was recovered, with a viscosity of 364 centistokes at 100° F., and a silanol content of less than 0.1%.

The two experiments of Example 8, as well as Example 6, show the importance of conducting the reaction so as to prevent hydration of the potassium carbonate, in order to obtain more effective control of the polymerization.

As already indicated the improved condensation process is applicable to starting silanes containing Si—OR groupings, while still retaining such bonds in the final polymer. This is illustrated in the following three examples.

Example 9

One mole of ethylethoxy dichlorosilane, $$(C_2H_5)Si(OC_2H_5)Cl_2$$

was hydrolyzed, by adding this silane to a slurry of 300 grams of sodium bicarbonate in 800 ml. of acetone. The recovered product, a light oil comprising low molecular weight, partially condensed, ethyl ethoxysiloxane, was heated with potassium carbonate to 80° C., under 5 mm. pressure for 2 hours. A highly viscous oil was obtained, which by analysis was shown still to retain ethoxy groups bonded to the silicon.

Example 10

Two hundred grams of a mixture containing 3 parts of ethylethoxy dichlorosilane and 1 part of diethyl dichlorosilane were co-hydrolyzed, using 300 grams of sodium bicarbonate in 500 cc. of acetone. The desolvated hydrolyzate, a silanol with the initial ethoxy grouping intact, was heated at 135° C. under atmospheric pressure for two and a half hours in the presence of 3 grams of potassium carbonate. A thick oily polymer resulted, which by analysis was found still to retain the Si—OR grouping.

Example 11

By the same bicarbonate hydrolysis technique already described, a hydrolyzate was prepared from a mixture of 2 moles of diethyldichlorosilane, 1 mole of diphenyldichlorosilane, and 1 mole of phenylethoxy dichlorosilane. This silanol mixture was treated with 5 grams of potassium carbonate at atmospheric pressure for 1 hour at 140° C., and the oily polymer resulting was again found to have the initial ethoxy grouping intact.

Example 12

In order to test the effect of weak acid potassium salts other than the carbonate, experiments were made using as the added salt potassium bicarbonate, potassium cyanide and potassium phosphate. These tests were carried out by heating 50 grams of diethyl silanediol with 5 grams of the respective dry potassium salts, at about 125° C. and under about 5 mm. of mercury pressure. The products, dissolved in ether, were washed with water to remove the salt, separated from the water and dried with calcium sulfate. After stripping off the ether under vacuum at 100° C., oils of varying viscosity were obtained. There is clear indication that with suitable, and slight, alterations in temperature, salt concentrations, or other reaction conditions, the viscosity, or extent of polymerization, in the final product can be quite readily controlled.

In all of the above examples the hydrolysis step described is one using the sodium bicarbonate technique, which has proven to have many advantages, but other, and older, ways of hydrolyzing, such as the ether-ice method, can be appropriate, while still utilizing the improved condensing reaction of this invention. Usually certain heating is desirable to promote the reaction, but with some starting materials, particularly such as the trifunctional silane derivatives, which condense more readily than others, effective polymerization can be obtained at substantially atmospheric temperatures. Anhydrous potassium carbonate is a preferred condensing agent, but, as indicated, other weak acid salts of potassium are considered similarly effective. Operation under vacuum is a convenient means for maintaining substantially anhydrous conditions in the reaction zone, but other ways of accomplishing this, such as by nitrogen sparging, can also be used.

The wide applicability of the process, so far as the starting silane materials are concerned, has been well illustrated, and many variations in actual operational steps

I claim:

1. In the making of organopolysiloxanes by hydrolysis of a hydrolyzable organosilane taken from the group consisting of hydrocarbon and hydrocarbonoxysilanes with subsequent condensation, the improvement which comprises condensing the intermediate hydrolysis product in contact with a substantially anhydrous potassium salt of a weak inorganic acid, while providing for removal of water of condensation from the reaction zone.

2. In the making of organopolysiloxanes by hydrolysis of a hydrolyzable organosilane taken from the group consisting of hydrocarbon and hydrocarbonoxysilanes with subsequent condensation, the improvement which comprises condensing the intermediate hydrolysis product in contact with substantially anhydrous potassium carbonate, while providing for removal of water of condensation from the reaction zone.

3. In the making of organopolysiloxanes by hydrolysis of an organohalosilane taken from the group consisting of hydrocarbonhalosilane and hydrocarbonoxyhalosilanes with subsequent condensation, the improvement which comprises heating the intermediate hydrolysis product of said organohalosilane in the presence of anhydrous potassium carbonate, while maintaining reduced pressure and a temperature sufficient to provide for removal of water of condensation from the reaction zone.

4. In the making of organopolysiloxanes by hydrolysis of an organohalosilane taken from the group consisting of hydrocarbonhalosilane and hydrocarbonoxyhalosilanes with subsequent condensation, the improvement which comprises heating the intermediate hydrolysis product of said organohalosilane in the presence of anhydrous potassium cyanide, while maintaining reduced pressure and a temperature sufficient to provide for removal of water of condensation from the reaction zone.

5. A process for preparing organopolysiloxanes which comprises reacting an organohalosilane taken from the group consisting of hydrocarbonhalosilanes and hydrocarbonoxyhalosilanes, with sodium bicarbonate under substantially anhydrous conditions to produce silanol compounds and condensing said silanol compounds by contacting therewith a substantially anhydrous potassium salt of a weak inorganic acid while providing for the removal of water of condensation from the reaction zone.

6. A process for preparing an organopolysiloxane which comprises reacting an organohalosilane taken from the group consisting of hydrocarbonhalosilanes and hydrocarbonoxyhalosilanes with sodium bicarbonate under substantially anhydrous conditions to produce silanol compounds and condensing said silanol compounds by heating said silanol compounds while in contact with anhydrous potassium carbonate under reduced pressure and at a temperature sufficient to provide for the removal of water of condensation from the reaction zone.

7. A process for preparing organopolysiloxanes which comprises reacting a mixture of diethyldichlorosilane and trimethylchlorosilane with sodium bicarbonate, under substantially anhydrous conditions, to produce silanol compounds and condensing said silanol compounds to a viscous oil by heating said silanol compounds, while in contact with anhydrous potassium carbonate, to a reflux temperature under reduced pressure.

8. A process of condensing organosilanols having the formula $$R_xSi(OH)_{4-x}$$

wherein R is an organic radical taken from the group consisting of hydrocarbon radicals and hydrocarbonoxy radicals and x is an integer from 1 to 3, to polyorganosiloxanes which comprises heating said organosilanols in the presence of a substantially anhydrous potassium salt of a weak inorganic acid, while providing for the removal of water of condensation from the reaction zone.

9. A process of condensing organosilanols having the formula $$R_xSi(OH)_{4-x}$$

wherein R is an organic radical taken from the group consisting of hydrocarbon radicals and hydrocarbonoxy radicals and x is an integer from 1 to 3, to polyorganosiloxanes which comprises heating said organosilanols in the presence of substantially anhydrous potassium carbonate, while providing for the removal of water of condensation from the reaction zone.

10. A process of condensing organosilanols having the formula $$R_xSi(OH)_{4-x}$$

wherein R is an organic radical taken from the group consisting of hydrocarbon radicals and hydrocarbonoxy radicals and x is an integer from 1 to 3, to polyorganosiloxanes which comprises heating said organosilanols in the presence of substantially anhydrous potassium cyanide, while providing for the removal of water of condensation from the reaction zone.

11. A process of condensing organosilanols having the formula $$R_xSi(OH)_{4-x}$$

wherein R is a hydrocarbon radical and x is an integer from 1 to 3, to polyorganosiloxanes which comprises heating said organosilanols in the presence of a substantially anhydrous potassium salt of a weak inorganic acid, while providing for the removal of water of condensation from the reaction zone.

12. A process of condensing organosilanols having the formula $$R_xSi(OH)_{4-x}$$

wherein R is an alkyl radical and x is an integer from 1 to 3, to polyorganosiloxanes which comprises heating said organosilanols in the presence of a substantially anhydrous potassium salt of a weak inorganic acid, while providing for the removal of water of condensation from the reaction zone.

13. A process of condensing organosilanols having the formula $$R_x Si(OH)_{4-x}$$

wherein R is an aryl radical and x is an integer from 1 to 3, to polyorganosiloxanes which comprises heating said organosilanols in the presence of a substantially anhydrous potassium salt of a weak inorganic acid, while providing for the removal of water of condensation from the reaction zone.

14. A process of condensing organosilanols having the formula $$(R')_y(R)_xSi(OH)_{[4-x-y]}$$

wherein R is a hydrocarbon radical, R' is a hydrocarbonoxy radical, x is an integer of from 1 to 3, y is an integer of from 0 to 2 and x+y is not greater than 3, which comprises heating said organosilanols in the presence of a substantially anhydrous potassium salt of a weak inorganic acid, while providing for the removal of water of condensation from the reaction zone.

References Cited in the file of this patent

UNITED STATES PATENTS

| Number | Name | Date |
| --- | --- | --- |
| 2,258,218 | Rochow | Oct. 7, 1941 |
| 2,395,550 | Iler | Feb. 26, 1946 |
| 2,426,912 | Wright | Sept. 2, 1947 |
| 2,449,572 | Welsh | Sept. 21, 1948 |
| 2,457,539 | Elliot et al. | Dec. 28, 1948 |
| 2,482,276 | Hyde et al. | Sept. 20, 1949 |
| 2,590,812 | Barry | Mar. 25, 1952 |
| 2,646,441 | Duane | July 21, 1953 |